Dec. 30, 1952 R. E. SPECKMANN 2,623,390
DIFFERENTIAL HYDROSTATIC PRESSURE TYPE DEVICE
Filed Nov. 1, 1948 2 SHEETS—SHEET 1

Inventor: R. E. Speckmann
By: [signature]
His Attorney

Dec. 30, 1952　　　R. E. SPECKMANN　　　2,623,390
DIFFERENTIAL HYDROSTATIC PRESSURE TYPE DEVICE
Filed Nov. 1, 1948　　　　　　　　　　2 SHEETS—SHEET 2
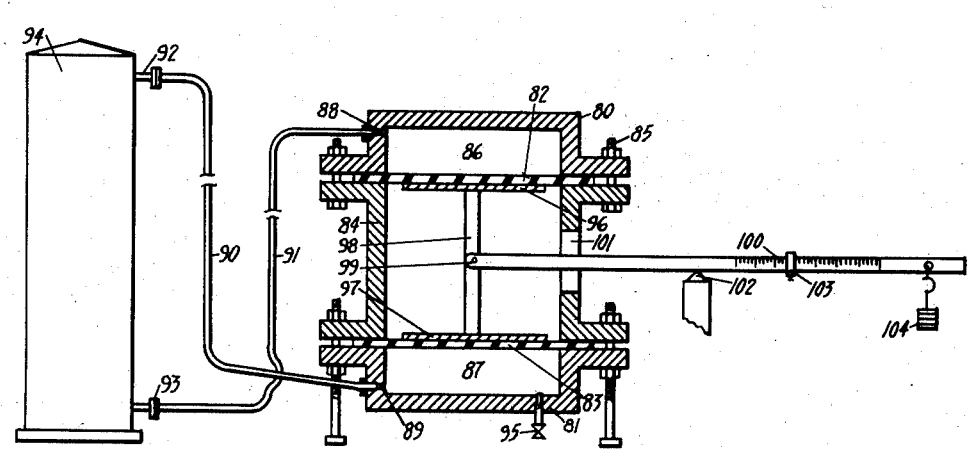
Fig. 2
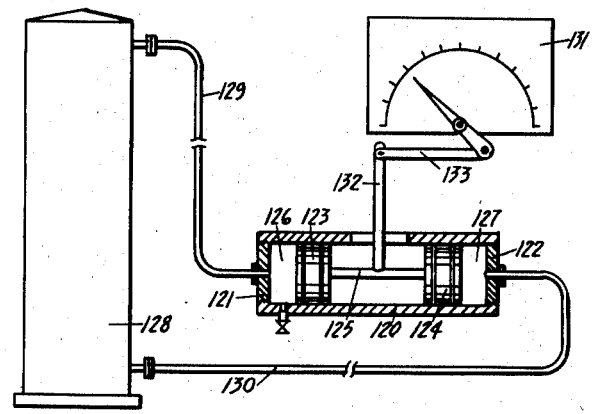
Fig. 3.
Inventor: R. E. Speckmann
By: 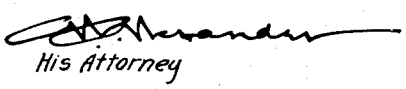
His Attorney Patented Dec. 30, 1952

2,623,390

UNITED STATES PATENT OFFICE 2,623,390

DIFFERENTIAL HYDROSTATIC PRESSURE TYPE DEVICE

Robert E. Speckmann, Gary, Ind., assignor to Shell Development Company, San Francisco, Calif., a corporation of Delaware Application November 1, 1948, Serial No. 57,785

2 Claims. (Cl. 73—299)

This invention relates to an apparatus for determining the amount of liquid contained in large storage tanks and pertains more particularly to a device for measuring the amount of a volatile liquid in a sealed storage tank from a remote measuring station.

At present, the amount or weight of a liquid contained in a storage tank is normally determined manually by a gauger who opens a port or manhole on the top of the tank and, by means of a measuring tape and thermometer, obtains a measurement of the height of the liquid and its temperature. Knowing the temperature and specific gravity of the fluid, the height of the fluid in the tank and the tank dimensions, it is possible to calculate the amount of fluid in the tank.

The gauging of large liquid storage tanks by such methods involves the following drawbacks: (1) the method is time-consuming, (2) errors may be made in both the depth and temperature measurements as well as in subsequent calculations, (3) it is generally impossible to obtain a truly representative temperature reading of the fluid in a tank, (4) it is often dangerous to measure tanks containing corrosive or toxic liquids in this manner, and (5) tanks under pressure or sealed tanks cannot readily be manually gauged.

It is, therefore, a primary object of the present invention to provide a system for accurately determining the amount of liquid in any type of a liquid storage tank by weighing a column of liquid in said tank, whereby knowing the average gravity of the liquid and the tank dimensions, its volume at any desired base temperature may be calculated, the system being operative whether the tank is open or closed, vented or sealed, or sealed and under a positive or negative pressure.

It is also an object of this invention to provide an apparatus for determining the weight of a column of a volatile liquid of fixed diameter in a sealed tank, whereby a weight reading may be read directly from said apparatus, said reading being a direct function of the amount of liquid in the tank irrespective of the vapor pressure in the sealed tank.

Another object of the present invention is to provide an apparatus for measuring by weighing a column of liquid of known diameter in a storage tank, said apparatus being adapted to be remotely located from the storage tank.

A further object of this invention is to provide a weight-type gauging device which may be selectively connected to a plurality of sealed storage tanks on a tank farm for determining at any instance the amount of liquid contained in any one tank.

These and other objects of this invention will be understood from the following description taken with reference to the attached drawing, wherein:

Figures 1 and 2 are diagrammatic views, partly in cross section, showing two embodiments of the weight-type gauging device of the present invention in communication with storage tanks.

Figure 3 is a diagrammatic view, partly in cross section, showing a piston-type weight-type gauging device incorporating a dial scale as indicating means.

Figure 1:
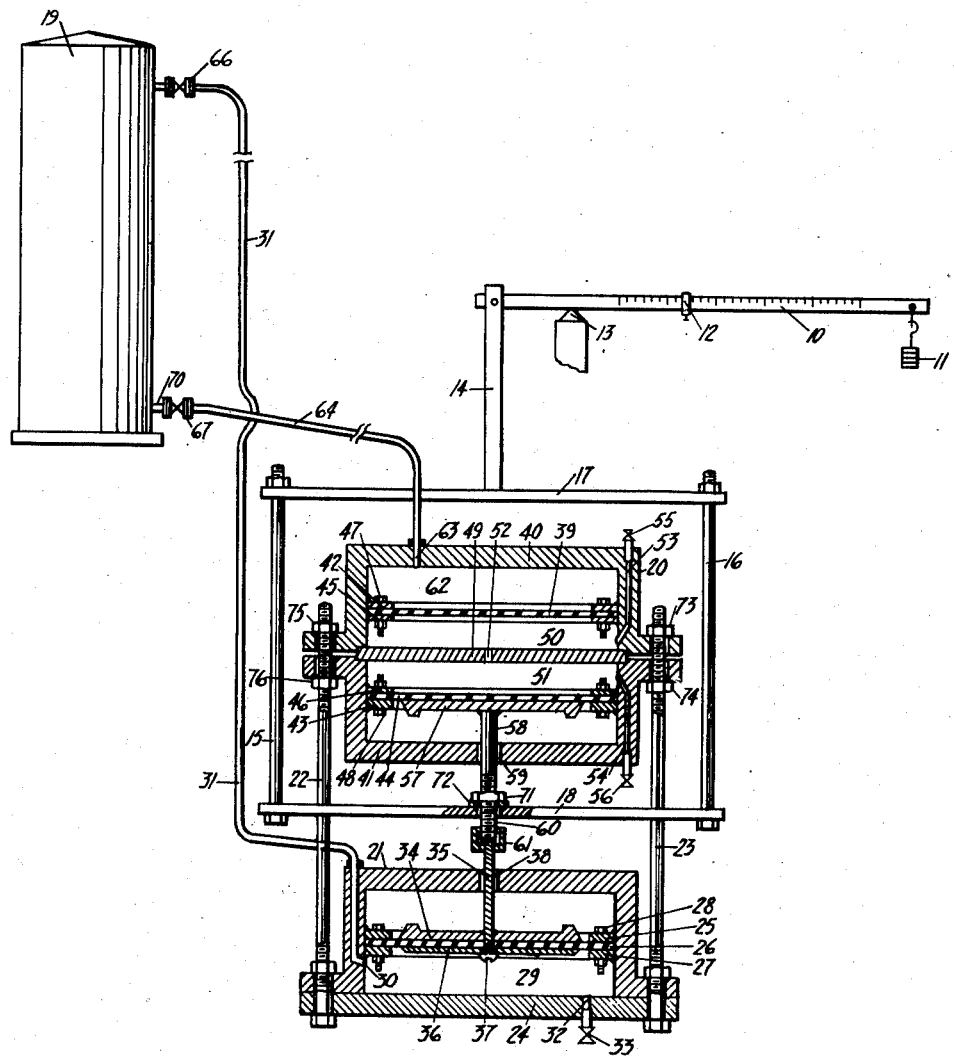

A preferred embodiment of the weight-type gauging device is shown in Figure 1 as comprising a scale beam 10, counter weights 11 attachable to one end of said scale beam, a sliding weight 12 mounted for sliding movement along said beam 10, a pivot 13 upon which said scale beam 10 may be pivoted, and linkage means pivotally secured to the other end of said scale beam comprising vertical bar members 14, 15 and 16 and horizontal bar members 17 and 18, said linkage means being operatively connected to and actuated by a diaphragm assembly that is responsive to changes in the amount of fluid contained in a storage tank 19.

The diaphragm assembly comprises upper and lower diaphragm housings, 20 and 21, respectively, which are secured in fixed vertical spaced relationship with respect to each other by any suitable support means such, for example, as a plurality of rods 22 and 23. The lower diaphragm housing 21 may be closed in a fluid-tight manner by a bottom plate or blank flange 24, which may be bolted to said housing 21. Secured in any suitable manner, as by welding, to the inner walls of the lower housing 21, is an internal peripheral flange 25 which is adapted to seat thereon a pressure responsive movable partition member or flexible diaphragm 26 and a holding member or ring 27 which has a shape similar to the flange 25, both being preferably annular in shape. Thus, the diaphragm 26 may be secured between said flange 25 and holding ring 27 by bolts 28 to form a fluid-tight pressure chamber 29, which preferably constitutes the vapor chamber of the present apparatus.

A normally open vapor pressure inlet port 30 to vapor chamber 29 may be formed in the wall of the lower diaphragm housing for admitting vapor pressure thereto from a conduit 31. Port means 32, in the bottom plate 24, serve as an outlet for draining condensed vapors from the vapor chamber 29, said port means being normally closed by a valve 33.

Mounted in contact with the vapor diaphragm 26 and responsive to any movement thereof are vapor pressure piston means comprising a vapor pressure piston 34 having rod means or a piston stem 35 fixedly secured at right angles thereto in any suitable manner as by welding, screw threads or the like. Preferably, the piston 34 is of sufficient area to contact substantially the entire area of the diaphragm 26; at least a major portion of said diaphragm. A diaphragm plate 36 is positioned on the bottom side of the diaphragm 26 and secured to the piston 34 or piston stem 35 by suitable bolt 37 or other means which passes through the diaphragm 26 so that with a vacuum existing in the vapor chamber 29, a positive force is exerted on the piston 34. The piston stem 35 extends upward through the housing 21 which has a central opening 38 therethrough.

In construction, the upper diaphragm housing 20 may comprise a unit that is similar to that of the lower housing 21 with the exception that it is inverted with relation to the lower housing 21. Preferably, instead of a single liquid diaphragm 39 being used, a double diaphragm unit is employed to eliminate the effects of any sudden changes in pressure to which the apparatus might be subjected. The upper diaphragm housing 20 is divided into top and bottom flanged sections 40 and 41 which are secured together in a fluid-tight manner by bolt means or between nuts 73, 74, 75 and 76 on the threaded upper portions of spacer rods 22 and 23. Welded to the inner walls of said sections 40 and 41 are internal peripheral flanges 42 and 43, respectively, to which parallel upper and lower liquid pressure diaphragms 39 and 44 may be secured by holding members or rings 45 and 46 and bolts 47 and 48. A rigid plate 49 is fixedly positioned between the upper and lower liquid diaphragms 39 and 44, effectively forming fluid chambers 50 and 51 on either side of said plate. Preferably, the plate 49 is mounted in recessed portions of the upper and lower sections 40 and 41, as shown in Figure 1.

An aperture 52 in the plate 49 provides communication with fluid chambers 50 and 51 which are normally filled with any suitable clean fluid such as oil, said fluid being preferably substantially incompressible, of a constant viscosity and having a low freezing point. The chambers 50 and 51 may be filled through one of the conduits 53 and 54 which are normally closed by valves 55 and 56.

Mounted in contact with lower liquid pressure diaphragm 44 and responsive to any movement thereof is a liquid pressure piston 57 having downwardly extending rod means or a piston stem 58 fixedly secured at right angles thereto in any suitable manner, as by welding. The piston stem 58 extends downward through the housing 20 which may be open at the bottom or have only a small central opening 59 therethrough. While the present embodiment has been described as utilizing piston means mounted adjacent to the diaphragms 26 and 44, it is realized that the piston stems 35 and 58 may be secured directly to the diaphragms in any suitable manner, as by welding, bolting, or the like depending on whether the diaphragms are made of thin flexible sheet metal or of a flexible material such as rubber, synthetic rubber or a suitable plastic material.

The lower end of the liquid pressure piston stem 58 (Figure 1) is threaded as at numeral 60 whereby it may be rigidly secured by a coupling 61 to the vapor piston stem 35 to form a connecting rod having a length equal to the distance between the diaphragms 26 and 44 when no pressure is applied from the tank to said diaphragms. The weight of the piston means is supported by, and operatively linked to, the movable horizontal bar 18, there being an adjustable support nut 71 and washer 72 carried on the threaded portion 60 of the piston stem 58 against which the normally positive upward pull of the movable bar 18 of the scale lever means may act. The nut 71 is preferably adjustable on the screw-threaded element 60 to permit a proper adjustment and calibration of the indicating or scale unit.

The upper diaphragm 39 forms a pressure-tight fluid chamber 62 inside the upper diaphragm housing 20, said chamber having normally open fluid inlet means 63. The fluid chamber 62 is in communication with the fluid at or near the bottom of the storage tank 19 through suitable conduit means 64. Valve means 66 and 67 may be installed for closing the conduits 31 and 64 when the apparatus is being serviced.

In operation, the present weight gauging device may be positioned adjacent the storage tank 19 or at any distance therefrom, preferably with the top side of the liquid pressure diaphragm 39 of the diaphragm assembly of the apparatus at the same level as the bottom of the tank 19 to which the liquid conduit 64 is connected. Before measuring the weight of a column of liquid of diameter equal to that of liquid piston and vapor piston in the storage tank 19, all the valves in the conduits 31 and 64 between the tank 19 and the vapor and fluid chambers 29 and 62 of the diaphragm assembly are opened. It is now possible to measure the liquid head pressure exerted by the fluid contained in the tank above its lower outlet 70. Since the liquid chamber 62 of the diaphragm assembly is in communication through conduit 64 with the bottom of the tank 19, the total head pressure due to the liquid head plus vapor head above the liquid is applied to the upper liquid diaphragm 39 causing it to be flexed.

When the valve 67 in the fluid conduit is opened before making a weighing, the upper liquid diaphragm may be subjected to a sudden increase in pressure if a delivery of fluid has been made to the tank subsequent to another weighing. Possible rupture of the upper liquid diaphragm by such a sudden increase in pressure is prevented by the use of fluid-filled double diaphragm unit. Since the fluid chambers 50 and 51 are filled with a separate fluid and sealed so that none of this fluid can escape, an independent fluid system is formed which is affected only when pressure is applied to either diaphragm 39 or diaphragm 44. Thus, when pressure is applied to the top surface of the upper liquid diaphragm 39, the pressure bends the flexible diaphragm 39 toward the central rigid plate 49 and the fluid in the chamber 50 between said diaphragm and said plate is forced through the central aperture 52 into the other chamber 51 on the opposite side of the plate 49 thus causing a corresponding movement to the lower liquid diaphragm 44. Since the aperture 52 is normally of a small size, the fluid between the diaphragms 39 and 44 is transferred only slowly to or from the chambers 50 and 51, thus effectively preventing any sudden flexure or possible rupture of the diaphragms. It is clear that expansible bellows may be used as equivalents of the flexible diaphragms 26, 39 and 44. It is essential that the lower liquid diaphragm 44 and the vapor diaphragm 26 have the same flexing area, preferably being of the same size and shape. Preferably, the areas of the liquid and vapor pistons, 57 and 34, respectively, are also equal.

As the lower liquid diaphragm 44 is flexed downward, the liquid pressure piston 57, stem 58 and nut 71 carried on said stem are moved downward. Since the nut 71 and its washer 72 are in contact with the horizontal bar 18 of the scale linkage means, said bar 18 and connected linkage bars 15, 16, 17 and 14 move downward causing a corresponding movement to the scale beam 10. By adding sufficient weights 11 or 12 to the scale beam 10, which is graduated in units of weight, the liquid head pressure in the tank may be measured. Thus, the actual weight of liquid in the tank 19 may be read directly on a properly calibrated scale 10. While the operation has been described with the linkage means connecting the diaphragm assembly to the scale beam 10, it is realized that any other suitable type of indicating device may be substituted therefor. While the liquid in the tank 19 is being weighed, the valve 66 is also open, so that the vapor chamber 29 is in communication with the space above the liquid in the tank for the operation of the vapor compensating unit of the present apparatus comprising housing 21, diaphragm 26, piston 34 and stem 35.

Since the two piston stems 35 and 58 are connected to each other, it will be seen that the flexible vapor diaphragm 26 and piston 34 will oppose the action of diaphragms 39 and 44 and piston 57 to compensate for any positive or negative pressure existing above the liquid in the storage tank. For example, when the tank is under pressure, the vapor load on the vapor pressure piston 34 is equal and opposite to that portion of the load on the piston 57 resulting from the vapor pressure head on top of the liquid in the tank. When the tank is under vacuum, the forces due to the atmospheric vacuum pressure differential on the two pistons are likewise equal and opposite. Thus, the net total downward force transmitted to and read on the balanced scale beam 10, for example, as pounds and fractions thereof, is always due only to the liquid head pressure on the liquid piston 57, the vapor head being effectively canceled out.

The underside of the liquid piston 57 and the upperside of the vapor piston 34 are always exposed to atmospheric pressure. Before a weight reading is taken, the drain valve 33 is opened allowing any condensed vapors to drain from the vapor chamber 29, thus eliminating the possibility of the chamber filling with condensate which might cause an erroneous operation of the vapor diaphragm 26.

It may be thought that results similar to those described above could be obtained with a device embodying a single diaphragm, and applying vapor pressure to one side thereof while exposing its other side to the combined vapor and liquid heads of the tank. Such arrangement could be achieved, for example, by making the space above the diaphragm 62 pressure-tight and applying thereto the pressure of conduit 64. It will, however, be seen that such arrangement is inherently inferior to the one described above, since it necessarily entails passing the diaphragm and piston rod through the walls of a pressure chamber, which requires the use of pressure-tight bushings, or a stuffing box, and results in imposing upon said rod frictional forces which detract from the accuracy of the apparatus.

However, a modified and somewhat simplified embodiment of the present weight-type gauging device is shown in Figure 2 wherein upper and lower diaphragm housings 80 and 81, respectively, are closed by diaphragms 82 and 83 and are flanged to rigid spacing and support means 84, being secured thereto by bolts 85 with the diaphragms being fixedly anchored between the flanges. Thus, an upper liquid chamber 86 and a lower vapor chamber 87 are formed having liquid and vapor inlets 88 and 89, respectively. Suitable conduits 90 and 91 connect the fluid and vapor inlets 88 and 89 of the apparatus to liquid and vapor taps 93 and 92 at the bottom and top, respectively, of a liquid storage tank 94. The vapor chamber 87 is also provided with a condensate drain port 95. It is to be understood that the diaphragms 82 and 83 are necessarily of equal areas in order that the vapor and liquid pressures in the storage tank act on a weighing and indicating device proportionally. Bellows may be used as the equivalents of diaphragms.

In contact with the underside of the liquid diaphragm 82 and the upperside of the vapor diaphragm 83 are pistons 96 and 97 having a piston stem 98 fixedly secured thereto and spacing them in fixed relationship against the respective diaphragms in a manner similar to that described with regard to Figure 1. The piston stem 98 is connected by linkage means, such as a pin 99, to one end of a scale beam 100 which extends through a longitudinal slot 101 in said support means 84, said beam being mounted on a pivot 102 and having a sliding weight 103 thereon and additional weights 104 hung at the end thereof. It is obvious that this modified embodiment operates in a manner similar to the above-described procedure with regard to the embodiment of Figure 1.

It will be readily understood that a weight-type gauging device of the present invention may be selectively connected to any one of a plurality of storage tanks by means of a suitable manifolding arrangement.

Although the above-described embodiments of the present weight-type gauging device have utilized diaphragms of equal areas as the pressure-responsive movable partition members, it is to be understood that pistons, plungers, or other pressure-responsive members may serve as suitable equivalents. It is also realized that the pressure-responsive movable partition members may be positioned in side-by-side spaced parallel relationship as well as being vertically spaced. As diagrammatically shown in Figure 4, the pressure-responsive scale actuating means comprises a tubular housing 120 having its ends closed by plates 121 and 122. Mounted for sliding movement within said housing are piston means comprising movable pistons 123 and 124 secured in fixed spaced relationship by an axial rod 125 between their adjacent faces, said piston means forming fluid-tight chambers 126 and 127 at the ends of said housing. The chambers 126 and 127 are in communication with the top of a storage tank 128 above the liquid level and with the bottom of said tank through suitable conduits 129 and 130. A slot in the housing 120 permits the rod 125 of the piston means to be operatively connected to suitable indicating means, such as a dial-type scale 131, through linkage arms 132 and 133.

I claim as my invention:

1. A differential pressure indicator comprising first and second fluidtight chambers, a portion of the walls of each chamber being formed of a pressure-responsive movable partition having its outward face exposed to the atmosphere, said movable partitions having substantially equal areas and being arranged face to face in parallel planes, rod means rigidly connecting said movable partitions to each other at substantially their center points, indicating means connected to and actuated by the movement of said rod means for indicating the differential pressure applied to said movable partitions, port means leading into each of said first and second chambers for admitting fluids at different pressures thereto, whereby said connecting rod means are displaced proportionally to the difference of the opposing pressure applied to the two movable partitions of said chambers, one of said movable partitions comprising two substantially parallel flexible diaphragms spaced from each other and defining a fluidtight space therebetween, transverse plate means parallel to said diaphragms dividing said space into two zones, said space being filled with a pressure liquid, and orifice means in said plate means for transferring the pressure liquid from one to the other of said zones.

2. A differential pressure indicator comprising first and second fluidtight chambers, first diaphragm means forming a wall of said first fluidtight chamber, second diaphragm means forming a wall of said second fluidtight chamber, said first and second diaphragm means having substantially equal areas and being fixedly arranged face to face in parallel horizontal space relationship, the space between said first and second diaphragm means being open to atmospheric pressure, movable plate means mounted in contact with said first and second diaphragm means and movable therewith in response to difference of pressure in said chambers, a weigh beam, linkage means connecting said plate means to said weigh beam, said first diaphragm means comprising two substantially parallel flexible diaphragms in spaced relationship with each other defining a fluidtight space, transverse plate means parallel to said diaphragms dividing said space into two zones, said space being filled with a pressure liquid, and orifice means in said plate means for transferring the pressure liquid from one to the other of said zones.

ROBERT E. SPECKMANN.

REFERENCES CITED

The following references are of record in the file of this patent:

UNITED STATES PATENTS

| Number | Name | Date |
|---|---|---|
| 668,514 | Garrels et al. | Feb. 19, 1901 |
| 1,661,995 | Brown | Mar. 6, 1928 |
| 1,682,602 | Dawley | Aug. 28, 1928 |
| 2,548,960 | Ekstrom | Apr. 17, 1951 |

FOREIGN PATENTS

| Number | Country | Date |
|---|---|---|
| 50,294 | Sweden | Nov. 2, 1921 |
| 292,859 | Great Britain | June 28, 1928 |
| 484,764 | Great Britain | May 10, 1938 |
| 761,812 | France | Jan. 13, 1934 |